Patented Sept. 25, 1934

1,974,727

UNITED STATES PATENT OFFICE 1,974,727

PRODUCTION OF UNSATURATED KETONES

Erwin Schwenk, Berlin-Charlottenburg, and Erich Borgwardt, Berlin-Pankow, Germany, assignors to Schering-Kahlbaum A. G., Berlin, Germany No Drawing. Application March 10, 1933, Serial No. 660,234. In Germany March 11, 1932

4 Claims. (Cl. 260—131)

Our invention refers to the production of unsaturated ketones and has for one of its purposes to provide means whereby these compounds can be produced in a particularly simple and effective manner.

We have found that cyclo-olefines can be oxidized in a particularly simple manner by acting thereon with oxygen compounds of selenium including selenium dioxide and selenious acid. In this manner one obtains for instance from the 1-menthene a mixture of ketones from which a crystallized thio-semi-carbazone can be isolated by acting on the mixture in a well known manner with thio-semi-carbazide hydrochloride. Similar reactions occur when starting from 3-menthene cyclohexene, dipentene and other cyclic olefines.

In order to facilitate the further treatment of the first products of reaction, it is recommendable to carry the reaction through in the presence of suitable solvents and, if necessary, in a closed vessel. As solvents we have found liquids to be suitable which are capable of dissolving the oxidizing agents, such as the selenium dioxide used. We have found that apart from water the alcohols, such as methyl alcohol, ethyl alcohol and propyl alcohol, are particularly suited for use as solvents. The reaction then proceeds very smoothly, selenium metal separating out as a compact gray-black mass. The further treatment of the reaction mixture is exceedingly simple, since after removal of the selenium by filtration the products may be isolated by fractional distillation. In some cases an intermediate purification of the reaction mixture by distillation with steam is to be recommended.

Instead of causing the starting materials to react with each other under heating, we may also act on a mixture of the reaction materials with suitable rays, for instance ultra-violet rays.

In the practice of our invention, we may for instance proceed as follows:—

Example 1

100 parts by weight 1-menthene are mixed with 30 parts selenium dioxide and the mixture is heated to about 120° C. under vigorous stirring, the reaction being started at about 70° C. When the whole of the selenium dioxide has been converted into red selenium, the mixture is neutralized with sodium carbonate and distilled with steam. The oily distillate is dried and subjected to fractional distillation. From the fraction boiling at 212–220° C., which distinctly smells after menthone and caraway, there is obtained in the usual manner a thio-semi-carbazone melting at 158° C.

Example 2

25 parts α-pinene are dissolved in 50 parts ethyl alcohol. The solution is heated to boiling under stirring and in the course of 4 hours a solution of 20 parts selenium dioxide in 50 parts water and 50 parts alcohol is added drop by drop. After removing the precipitated selenium by filtration the alcohol is driven off from the filtrate by distillation. The residual oil is subjected to fractional distillation in vacuo, the main fraction, 22.5 parts of which are obtained, forming a colourless oil boiling under a pressure of 14 mm. mercury column at 96 to 99° C. This oil was found to be a ketone having the formula $C_{10}H_{14}O$. From this product a semi-carbazone melting at 208 to 211° C. can be obtained in the usual manner.

β-pinene behaves in a similar manner, and in this case a ketone boiling under 8 mms. pressure at 82 to 84° C. can be isolated.

Example 3

100 parts dipentene and 100 parts methyl alcohol are mixed with a solution of 80 parts selenium dioxide in 350 parts methyl alcohol and the mixture is boiled until all the selenium has been separated out. The semi-carbazone prepared in the usual manner melts at 201 to 202° C. On further treating same in a well known manner one obtains a ketone boiling at 98 to 105° C. under 10 to 11 mms. pressure.

If this reaction is carried out in a closed vessel at 120° C. the reaction proceeds in one half of the time.

Example 4

50 parts 3-menthene are boiled under the reflux condenser and under vigorous stirring with a solution of 40 parts selenious acid in 200 parts water. After the lapse of 10 hours the condenser is shifted into inclined position and the product of reaction subjected to distillation with steam. The oily distillate is separated by decantation and subjected to fractional distillation. One thus obtains besides a small first fraction a ketone boiling under 10 mms. pressure at 89 to 93° C. and yielding a semi-carbazone melting at 172 to 175° C.

Example 5

80 parts cyclohexene are dissolved in 100 parts alcohol and a solution of 100 parts selenious acid in 400 parts alcohol is added under stirring at 80° C. When the reaction has come to an end the liquid is separated from the precipitated selenium by filtration by suction and treated as described above. The cyclohexenone thus obtained boils under 14 mms. pressure at 60 to 65° C.

*Example 6*

10 parts α-pinene are dissolved in 100 parts alcohol and the solution is mixed with a solution of 8 parts selenium dioxide in ethyl alcohol. This mixture is now exposed in a glass bottle to the direct action of sun rays. Already after a short time selenium is separated out, which settles down partly as a red sludge and partly as solid almost black crystalline crusts on the wall of the bottle. After the lapse of about 48 to 72 hours the reaction has come to an end and the mixture is now treated further in a well known manner, yielding the ketone $C_{10}H_{14}O$, boiling under 14 mms. pressure at 97 to 100° C.

In a similar manner as here described ultraviolet rays, such as for instance obtainable from mercury vapor, can be used for irradiation and instead of the pinene other unsaturated compounds containing the group $CH=CH.CH_2$ can be used as starting materials.

Various changes may be made in the details disclosed in the foregoing specification without departing from the invention or sacrificing the advantages thereof.

We claim:—

1. The method of producing ketones of the cyclo-olefine series containing the same number of carbon atoms as the cyclo-olefines serving as starting products comprising acting at a temperature above normal on cyclo-olefines with a compound of the group constituted by selenium dioxide and selenious acid.

2. The method of producing ketones of the cyclo-olefine series containing the same number of carbon atoms as the cyclo-olefines serving as starting products comprising acting at a temperature above normal on cyclo-olefines with a compound of the group constituted by selenium dioxide and selenious acid in the presence of a solvent for the selenium compound.

3. The method of producing ketones of the cyclo-olefine series containing the same number of carbon atoms as the cyclo-olefines serving as starting products comprising acting at a temperature above normal on cyclo-olefines with a compound of the group constituted by selenium dioxide and selenious acid under pressure in the presence of a solvent for the selenium compound.

4. The method of producing ketones of the cyclo-olefine series containing the same number of carbon atoms as the cyclo-olefines serving as starting products comprising acting with ultraviolet rays on a mixture of a cyclo-olefine of the type described and a compound of the group constituted by selenium dioxide and selenious acid.

ERWIN SCHWENK,
ERICH BORGWARDT.